(No Model.)

L. T. HAWLEY.
Device for Preserving Butter.

No. 227,432.  Patented May 11, 1880.

WITNESSES:
E. Laass
C. Bendixen

INVENTOR:
Lewis T. Hawley
pr Duell, Laass & Hey
Attorneys

UNITED STATES PATENT OFFICE.

LEWIS T. HAWLEY, OF SYRACUSE, NEW YORK.

DEVICE FOR PRESERVING BUTTER.

SPECIFICATION forming part of Letters Patent No. 227,432, dated May 11, 1880.

Application filed March 10, 1880. (No model.)

*To all whom it may concern:*

Be it known that I, LEWIS T. HAWLEY, of Syracuse, in the county of Onondaga, in the State of New York, have invented new and useful Improvements in Devices for Preserving Butter, (not patented to me, nor with my knowledge or consent, in any foreign country,) of which the following, taken in connection with the accompanying drawings, is a full, clear, and exact description.

This invention relates to a novel, simple, convenient, and effective device designed to submerge butter in water or brine, and thus preserve the butter in a fresh and untainted condition.

The following description will enable others skilled in the art to make and use my invention.

Figure 1:
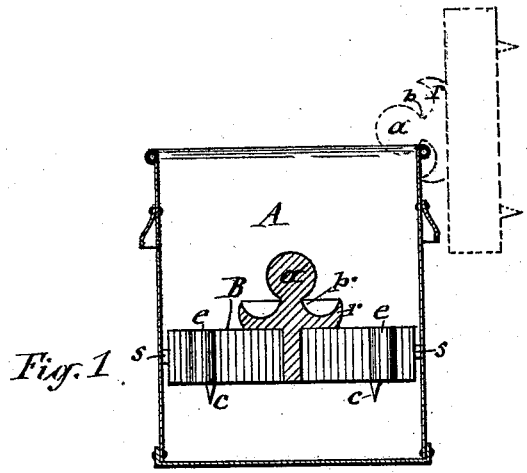
Figure 2:
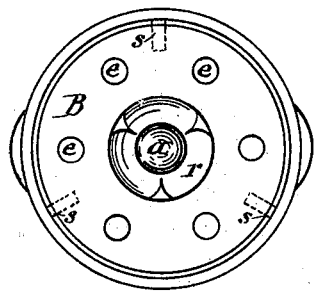
Figure 3:
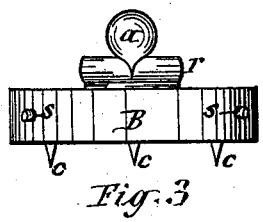

In the accompanying drawings, Figure 1 is a vertical section of my invention, showing it in position both when in use for maintaining the butter immersed in the water or brine and when removed from the butter to give access thereto. Fig. 2 is a top view of same, and Fig. 3 a side view of the plunger or immerser.

Similar letters of reference indicate corresponding parts.

A represents a crock, pail, or other cylindrical receptacle of any suitable material.

B denotes my improved device for submerging butter in water or brine in the aforesaid receptacle, and designated by me the "plunger" or "immerser," the same consisting of a plate adapted to easily enter horizontally the receptacle A, and provided on top with a handle for the manipulation of same. This plunger I prefer to make of wood, with the grain running transversely or at right angles to the plane thereof, thereby causing the same to more readily become saturated with the brine, and thus expel therefrom all taint, and increasing its specific gravity, so as to cause it to sink automatically. It is provided with perforations *e e*, so as to allow a free escape through it of the liquid displaced by the immersion of said plate, and thus facilitate the application of same to the butter designed to be submerged.

To the periphery of the plate B are attached rubber pads *s*, or other suitable devices—such as a wedge, for instance—by the frictional hold of which against the inner side of the receptacle the plate is retained immersed in the water or brine in said receptacle.

To obviate the necessity of laying the plunger B on its face, and thus soiling the same when removed from the butter, the handle thereof is made in the form of a knob, *a*, having a contracted neck, *b*, and provided at its base with a concave flange, *r*. This allows the plunger to be hung by the neck *b* of the knob upon the top edge of the receptacle A. The knob *a* and the flange *r*, bearing respectively against the inside and outside of the receptacle, properly support the plunger in its position, as indicated by dotted lines in Fig. 1 of the drawings.

The under side of the plunger B is provided with tapered pins *c*, which serve as feet for the support of the plunger when removed from the receptacle A, and in case the receptacle is not of sufficient height to allow the plunger to be hung thereon by the knob *a*, as before described.

Having thus described my invention, what I claim as new, and desire to secure by Letters Patent, is—

1. In combination with the receptacle A, the plunger B, when constructed of wood and with the grain thereof running from face to face transversely through the plunger, substantially as described, and for the purpose set forth.

2. In combination with the receptacle A, the plunger B, provided with the supporting-pins *c*, substantially as described and shown.

3. In combination with the receptacle A, the plunger B, provided with the knob *a*, having the neck *b*, and the circumferential concave flange *r*, substantially as described, for the purpose set forth.

In testimony whereof I have hereunto signed my name and affixed my seal in the presence of two attesting witnesses, at Syracuse, in the county of Onondaga and State of New York, this 19th day of February, 1880.

LEWIS T. HAWLEY. [L. S.]

Witnesses:
E. LAASS,
WM. C. RAYMOND.